United States Patent [19]
Aramaki

[11] Patent Number: 5,402,417
[45] Date of Patent: Mar. 28, 1995

[54] PACKET SWITCHING SYSTEM

[75] Inventor: Toshiya Aramaki, Tokyo, Japan

[73] Assignee: NEC Corporation, Tokyo, Japan

[21] Appl. No.: 198,266

[22] Filed: Feb. 18, 1994

[30] Foreign Application Priority Data

Feb. 23, 1993 [JP] Japan .................. 5-033663

[51] Int. Cl.$^6$ .......................................... H04L 12/56
[52] U.S. Cl. ......................................................... 370/60
[58] Field of Search ..................... 370/60, 60.1, 94.1, 370/58.1-58.3, 54, 94.2, 94.3; 340/825.8

[56] References Cited

U.S. PATENT DOCUMENTS

| | | | |
|---|---|---|---|
| 4,551,833 | 11/1985 | Turner | 370/54 |
| 4,899,335 | 2/1990 | Johnson, Jr. et al. | 370/60 |
| 5,274,642 | 12/1993 | Widjaja et al. | 370/60 |

OTHER PUBLICATIONS

Hayashi et al., "A Study On Control Algorithm For Large Scale ATM Switch", The Institute of Electronics, Information and Communication Engineers Technical Study Report, Switching System Engineering, SSE 89-173, (1989).

Primary Examiner—Douglas W. Olms
Assistant Examiner—Ajit Patel
Attorney, Agent, or Firm—Foley & Lardner

[57] ABSTRACT

A packet switching system includes a plurality of incoming channels, through which packets arrive. The system has a circuit providing arrival time information for header information of respective packets. The arrival time information is then copied by a copying circuit. The copied information is accumulated in an arrival time information accumulating circuit in an order of the arrival time. On the other hand, the packet is accumulated by a packet accumulating circuit in an order of the arrival time. A control circuit is adapted to output the packets accumulated in the packet accumulating circuit and having the arrival time information consistent with the arrival time information accumulated at the leading end of the arrival time information accumulating circuit. The packets are output from the packet accumulating circuit according to destinations contained in the header information thereof through a plurality of outgoing channels for feeding out the routed packets.

7 Claims, 9 Drawing Sheets

PACKET SWITCHING SYSTEM

BACKGROUND OF THE INVENTION

1. Field of the Invention

The present invention relates generally to a packet switching system. More specifically, the invention relates to a packet switching technology in a digital communication network employing a packet.

2. Description of the Related Art

High attention has been attracted for a high speed packet switching system for transmitting and exchanging information at ultra-high speed by transforming all information, such as voice, data, image and so forth in packets and employing simplified protocol. In such high speed packet switching system, a large scale packet switching system for more than several hundreds of channels is realized by connecting middle or small scale packet switches in a plurality of stages.

In such case, there is a system, in which the first stage packet switch does not perform a path selection for the input packet and the input packet is uniformly supplied to subsequent stages of packet switch regardless of its address information and path selection is performed in the subsequent stages of packet switch for simplification of a path selection control
and for preventing an internal blocking (which means a condition wherein a call cannot be connected due to blocking of an internal link despite of presence of vacant capacity of incoming channel and outgoing channel).

In this system, since each of packets of the same call passes different paths and thus it causes different delay time of respective packets having passed different paths, the order of the packet in the same call has an irregular sequence. A solution for this problem has been disclosed in a paper entitled "*A Study on Control Algorithm for Large Scale ATM Switch*" in The Institute of Electronics, Information and Communication Engineers Technical Study Report, Switching System Engineering—SSE 89-173, 1989.

Figure 9:
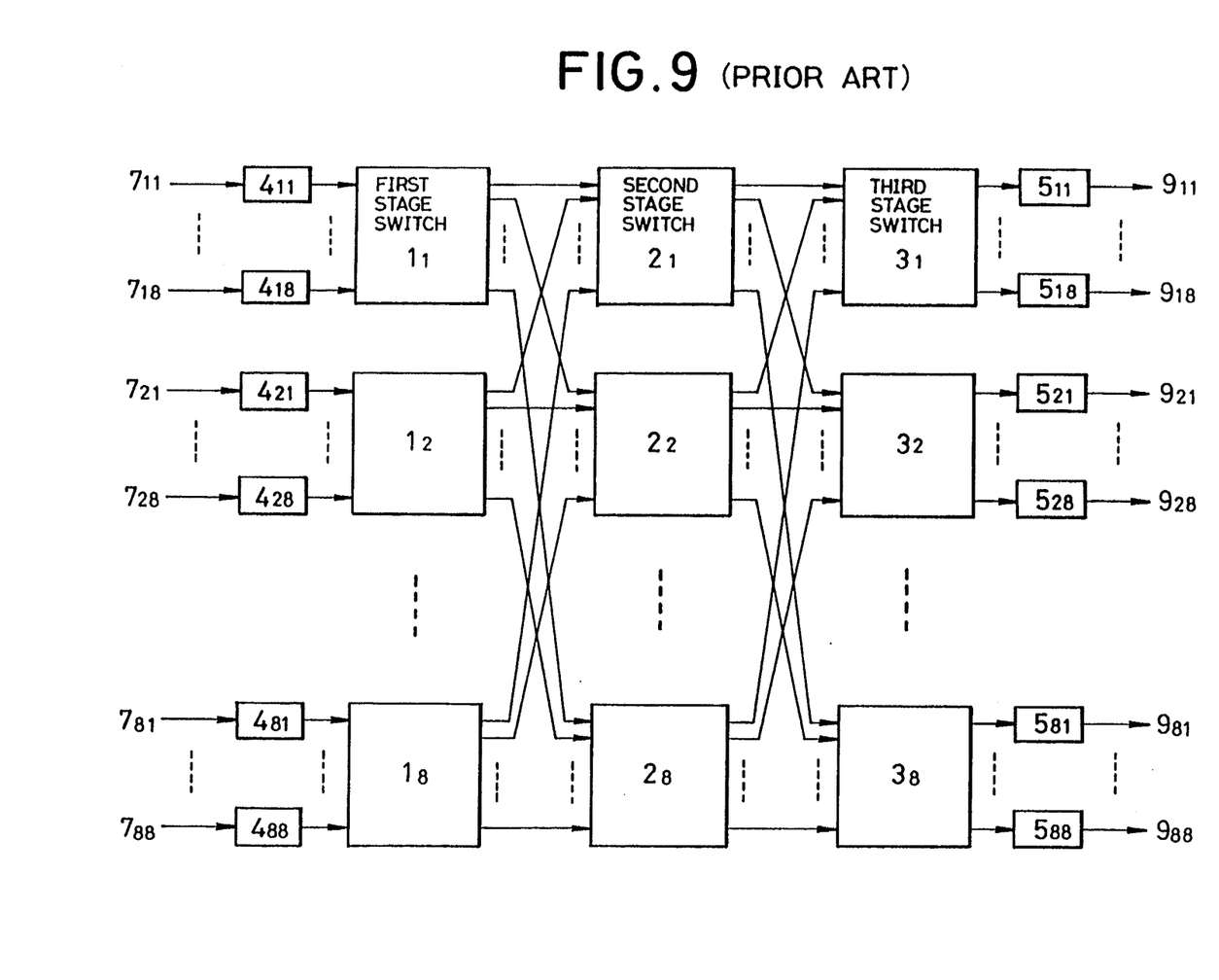
FIG. 9 is a schematic block diagram of the conventional packet switching system.

The conventional system will be discussed hereinafter with reference to FIG. 9. FIG. 9 shows the block diagram of the conventional system. In the above-identified literature, the switching system is constituted of three stages of switches, as shown in FIG. 9. Each of the input ports $7_{11}$–$7_{88}$ are provided for each of the first stage switches and each of the eight output ports $9_{11}$–$9_{88}$ are provided for each of the third stage switches.

Time stamping circuits $4_{11}$–$4_{88}$ are provided for each of the input ports and packet buffer circuit $5_{11}$–$5_{88}$ are also provided for each of the output ports. The time stamping circuit provides a time stamp representing input time information for each of the packets input at an input port. Each of input packets is distributed to respective second stage switches $2_1$–$2_8$ by the first stage switch regardless of address information, and then switched to desired destination per packet by the second stage switches $2_1$–$2_8$ and third stage switches $3_1$–$3_8$. After having passed through switches, the packets are once stored in packet sorting circuits $5_{11}$–$5_{88}$ which are provided at outlets of the third stage of switches $3_1$–$3_8$. Those stored packet are output to output ports $9_{11}$–$9_{88}$ in accordance with the time information order of a period longer than a predetermined period of time (a possible maximum delay period required for passing through the first stage switches $1_1$–$1_8$ to the third stage switches $3_1$–$3_8$) and whereby each of the packets of the same cell is arranged in order.

In such packet switching system, the delay period of the packet is inherently increased since the packet buffer circuits provide delay the packet for a period longer than the predetermined period of time. In addition, it is inherently required to make judgement whether the delay period exceeds the predetermined period of time for respective packets for large amount of control which results in complicated hardware construction.

SUMMARY OF THE INVENTION

Therefore, it is an object of the present invention to provide a packet switching system which can suppress increasing of a delay period of the packet and is easy to control.

Another object of the invention is to provide the packet switching system which can simplify a hardware necessary for controlling the arrangement of the packets in order.

In order to accomplish the above-mentioned and other objects, a packet switching system, according to one aspect of the invention, comprises:

a plurality of incoming channels, through which packets arrive;

time information providing means for providing arrival time information for header information of respective packets;

copying means for copying respective of the arrival time information provided in header information of respective of packets;

arrival time information accumulating means for accumulating the copied arrival time information in an order of the arrival time;

packet accumulating means for accumulating the packet provided with the arrival time information in its header information in an order of the arrival time;

control means for outputting the packets accumulated in the packet accumulating means and having the arrival time information consistent with the arrival time information accumulated at the leading end of the arrival time information accumulating means;

first switching means for routing the packets output from the packet accumulating means according to destinations contained in the header information thereof; and a plurality of outgoing channels for feeding out the routed packets.

In the preferred construction, the packet switching system further comprises second switching means for routing respective packets provided with the arrival time information depending upon the destinations contained in the header information thereof, and each packet routed by the second switching means is supplied to the packet accumulating means corresponding to the route.

According to another aspect of the invention, a packet switching system includes a plurality of incoming channels, through which packets arrive, means for providing arrival time information for header information of respective packets, switching means for routing the packets output from the packet accumulating means according to destinations contained in the header information thereof, means for sorting the routed packets according to the order of arrival time information, and a plurality of outgoing channels for feeding out the packets sorted by the sorting means, the system comprises:

copying means for copying respective of the arrival time information provided in header information of respective of packets; and means for transferring the arrival time information copied by the copying means to the sorting means, the sorting means including:

means for accumulating the transferred arrival time information in an order of the arrival time;

means for outputting the packets having the arrival time information consistent with the arrival time information at the leading end of the accumulating mean.

In the preferred construction, the copying means includes means for counting the number of packets provided with the same arrival time information, the transferring means includes means for transferring the counted number with the associated arrival time information, the sorting means includes means for storing the counted number with establishing correspondence with the arrival time information and means for updating the number stored by subtracting one at every occurrence of feeding out of the packet having the header information containing the same arrival time information.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiments of a packet switching system according to the present invention will be discussed hereinafter with deference to the accompanying drawings.

Figure 1:
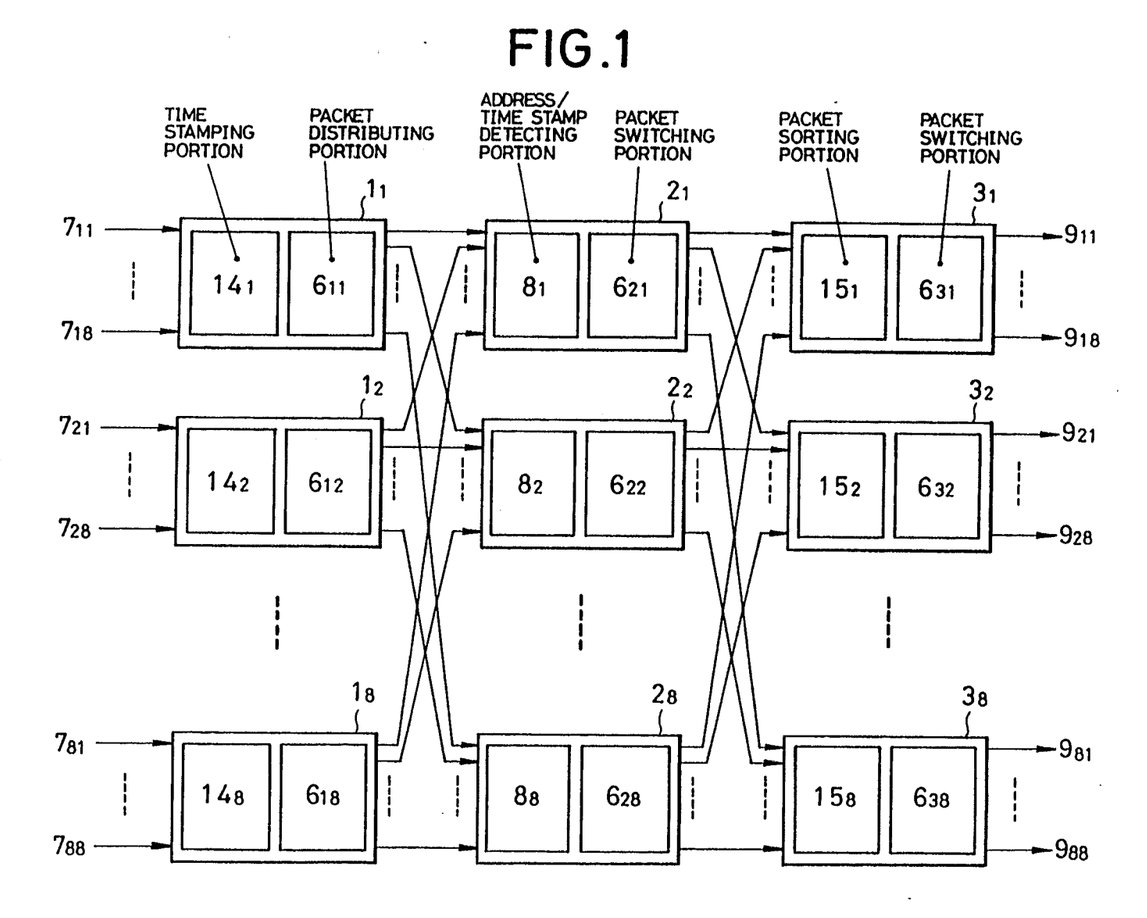
FIG. 1 is a schematic block diagram of one embodiment of packet switching system according to the present invention.

FIG. 1 shows the block diagram of one embodiment of a packet switching system in accordance with the present invention. In FIG. 1, there is provided 64 incoming channels $7_{11}$–$7_{88}$, through which packets arrive. For routing the packets, input through the incoming channels $7_{11}$–$7_{88}$, to respective destinations according to the header information of respective packets, cross-linked first stage switches $1_1$–$1_8$, second stage switches $2_1$–$2_8$ and third stage switches $3_1$–$3_8$ are provided in this order.

The first stage switches $1_1$–$1_8$ respectively comprise time stamping portions $14_1$–$14_8$ and packet distributing portions $6_{11}$–$6_{18}$. The time stamping portions provide arrival time information to the header information of respective input packets. Each packet distributing portion is a distributing switch to which input and output are connected in one-to-one relationship for varying state of connection.

The second stage switches $2_1$–$2_8$ comprise respectively address and time stamp detecting portions $8_1$–$8_8$ and packet switching portions $6_{21}$–$6_{28}$. The address/time stamp detecting portions detect the arrival time information contained in the header information of respective packets and copy the detected information. Each packet switching portion switches each of the packets without changing the order of arrival.

The third stage switch $3_1$–$3_8$ comprise packet sorting portions $15_1$–$15_8$ and packet switching portions $3_1$–$3_8$. The packet sorting portions arrange and store the arrival time information transferred from the second stage switches $2_1$–$2_8$ in the order of the arrival time. At this time, the packet sorting portions perform rearrangement of the received packets with reference to the arrival time information, and output the packet, whose arrival time information in the header coincides with the arrival time information stored in the leading end of the packet storing portion, to the third packet switching portion $6_{31}$–$6_{38}$. The packet switching portions $6_{31}$–$6_{38}$ have the same construction and function as those of the packet switching portions $6_{21}$–$6_{28}$.

Respective output packets of the third stage switch $3_1$–$3_8$ are fed to the outgoing channels $9_{11}$–$9_{88}$.

Figure 2:
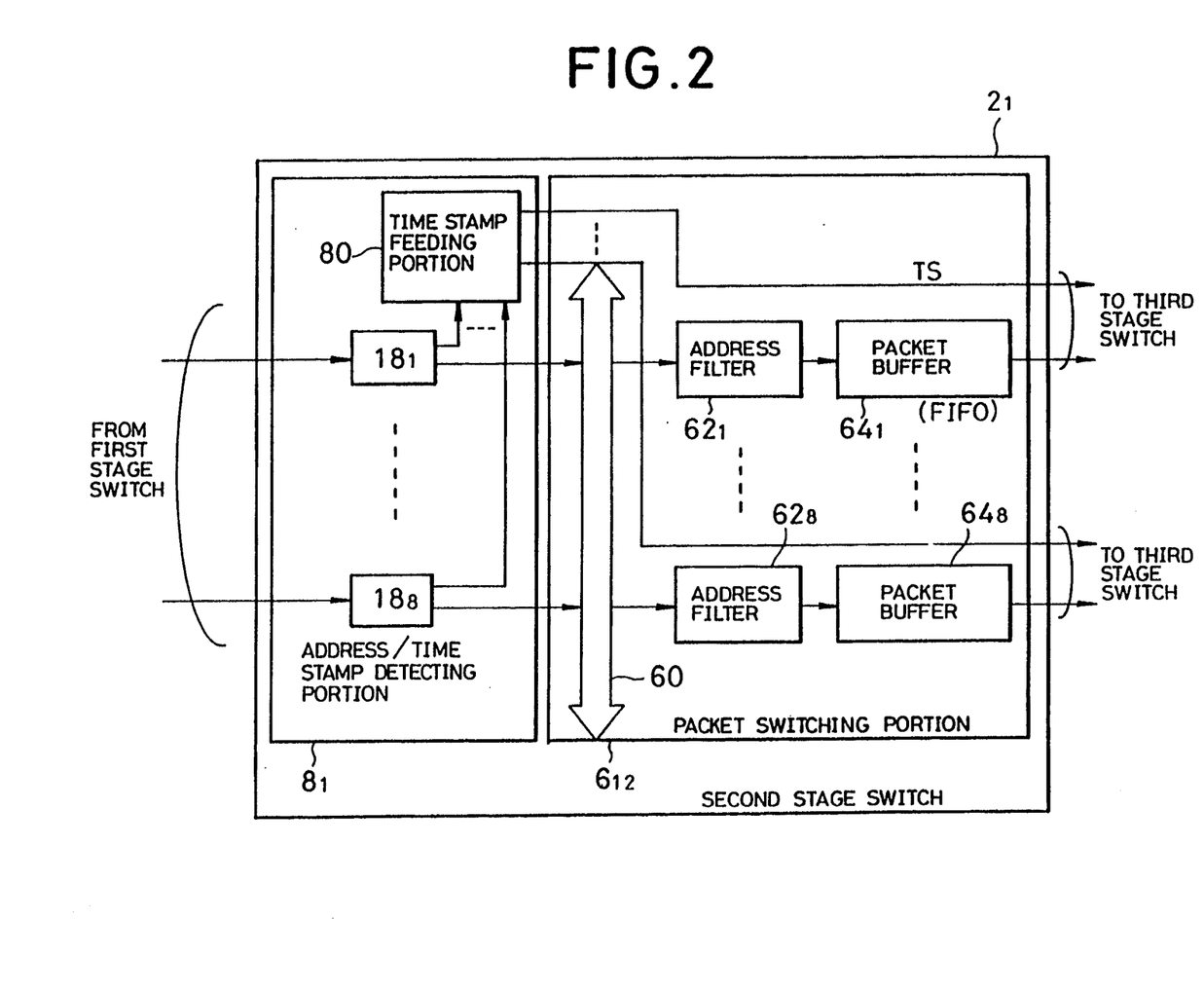
FIG. 2 is a block diagram of a second stage switch in one embodiment of the packet switching system.
Figure 3:
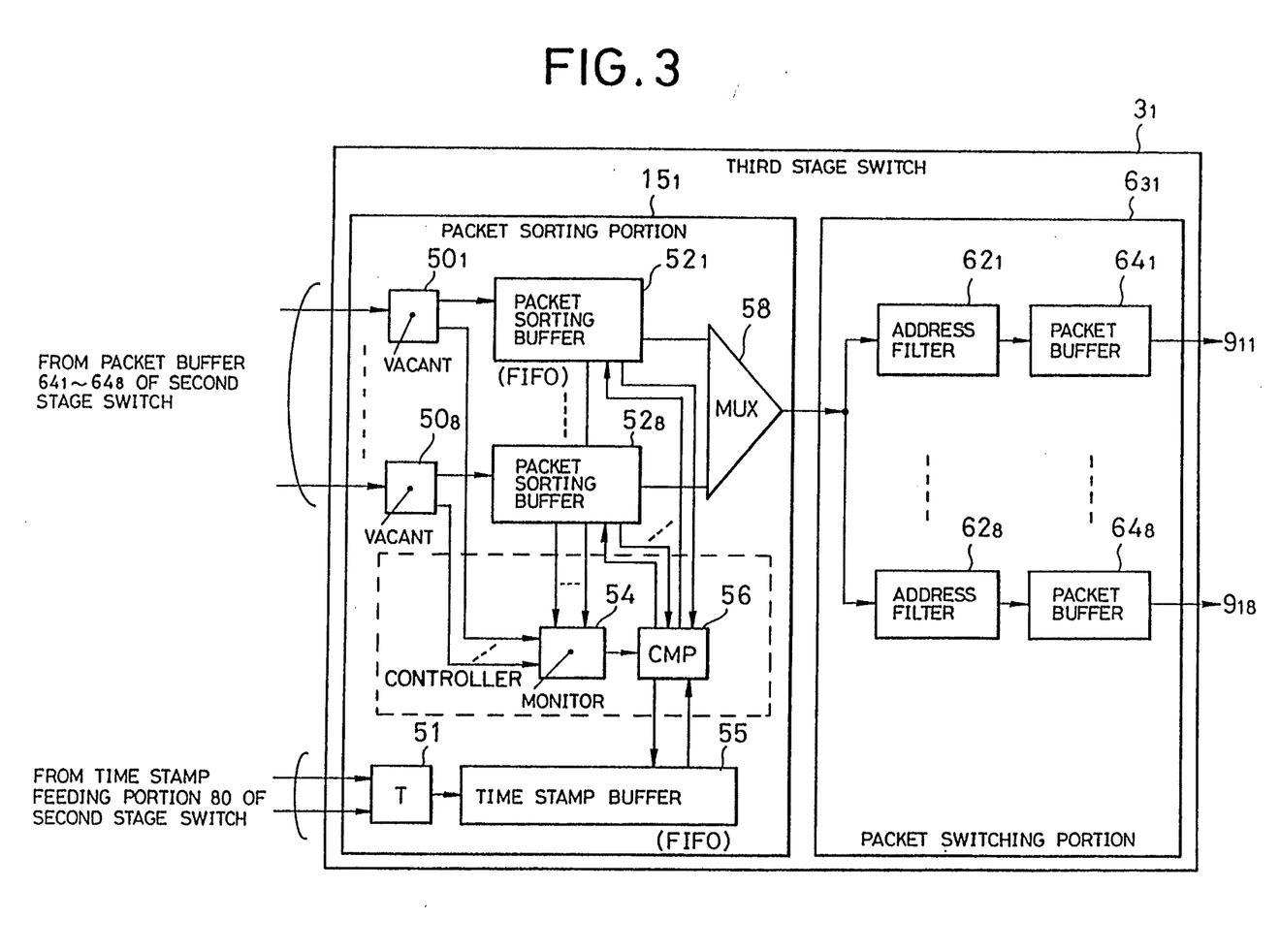
FIG. 3 is a block diagram of a third stage switch in one embodiment of the packet switching system.
Figure 4:
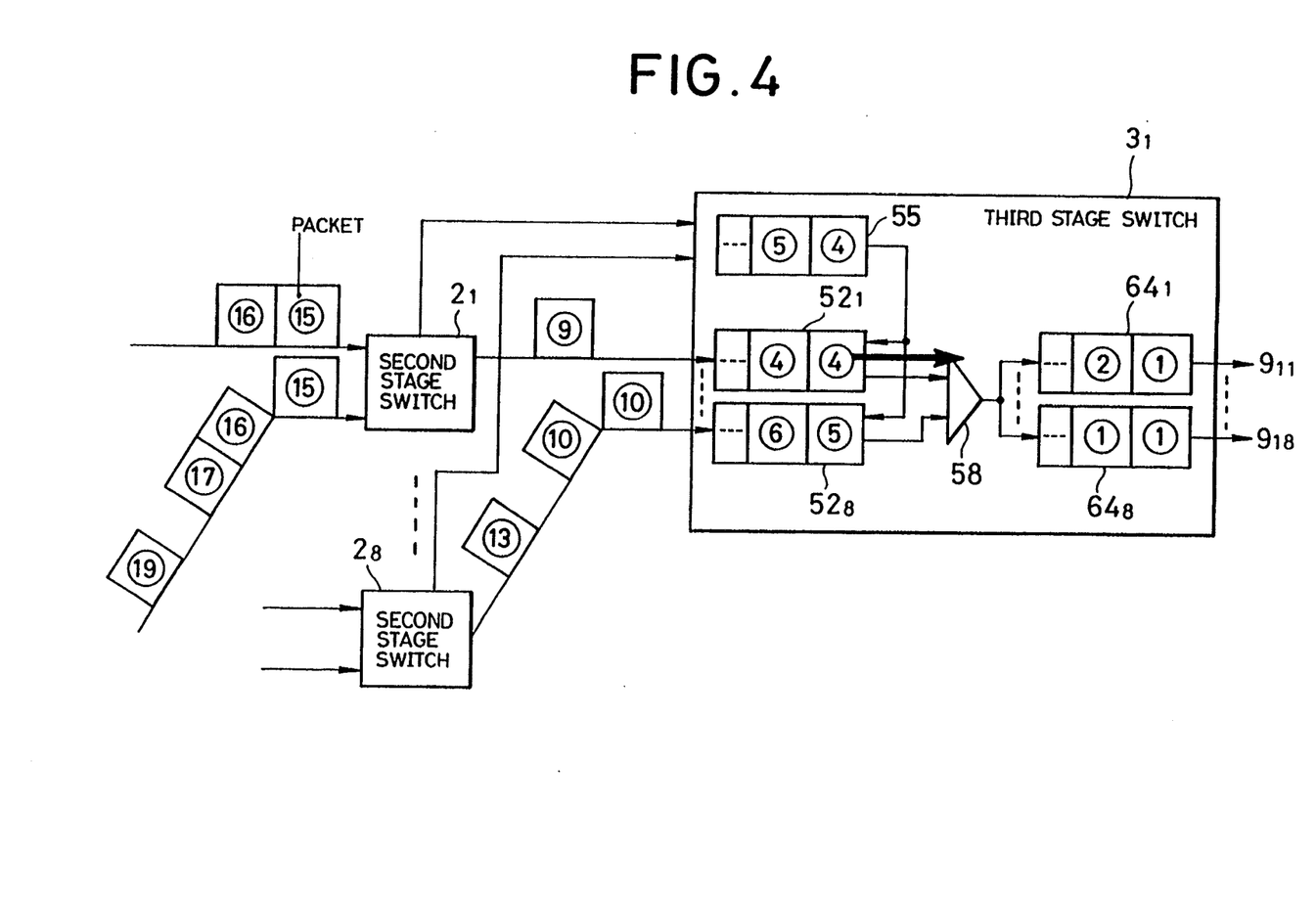
FIG. 4 is an illustration showing the operation of one embodiment of the packet switching system according to the present invention.
Figure 5:
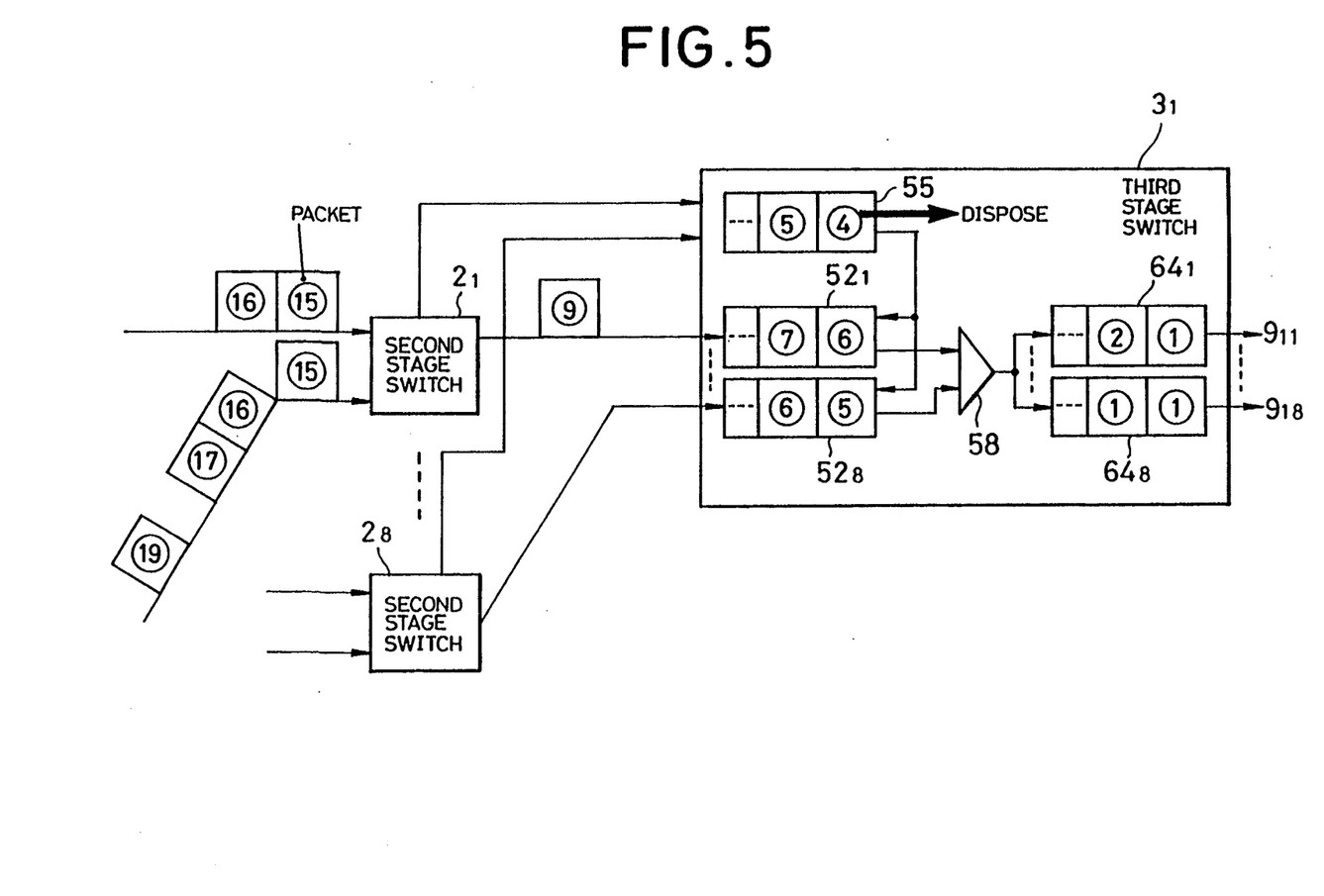
FIG. 5 is an illustration showing the operation of one embodiment of the packet switching system according to the present invention.

Next, the operations of respective portions of the shown embodiment of the packet switching system according to the present invention will be discussed with reference to FIGS. 2–5. For facilitating understanding, the operations will be discussed separately for the first stage switch $1_1$, the second stage switch $2_1$ and the third stage switch $3_1$. FIG. 2 is a block diagram of the second stage switch $2_1$ of the shown embodiment of the packet switching system of the invention. FIG. 3 is a block diagram of the third stage switch $3_1$ of the shown embodiment of the invention. FIGS. 4 and 5 are illustrations showing operation of the shown embodiment of the packet switching system of the invention.

In the first stage switch $1_1$, the time stamp, arrival time information is provided for the header information of the packet input through the incoming channels $7_{11}$–$7_{18}$ by the time stamping portion $14_1$. In order to avoid collision of the packets, the packets are distributed to eight output routes by the packet distributing portions $6_{11}$–$6_{18}$ for outputting to the second stage switch $2_1$.

As shown in FIG. 2, in address and time stamp detecting circuits $18_1$–$18_8$ of the address and time stamp detecting portion $8_1$ of the second stage switch $2_1$, address and time stamp are copied from the header information of the input packet. The copied time stamp is transferred to one of the third stage switches $3_1$–$3_8$ which accommodates one of outgoing channels $9_{11}$–$9_{88}$ corresponding to the address by a time stamp feeding circuit 80.

On the other hand, when two or more time stamps of the same time are transferred to the same third stage switch $3_1-3_8$, they are transferred to the third stage switch $3_1-3_8$ as one.

The packet past through the address and time stamp detecting circuit $18_1-18_8$ is temporarily stored in packet buffer $64_1-64_8$ corresponding to the address in the header information which is detected by address filter $62_1-62_8$ via a time division multiplexing bus 60, and then output to respective third stage switches $3_1-3_8$. The packet buffers $64_1-64_8$ are adapted to output empty packets to the third stage switch $3_1-3_8$ when no packet is accumulated therein.

As shown in FIG. 3, in the third stage switch $3_1$, the time stamps transferred from the second stage switches $2_1-2_8$ are accumulated in a time stamp buffer 55 in the order of arrival. In case that two or more time stamps of the same time are transferred from the different second stage switches $2_1-2_8$, a time stamp detecting circuit 51 accumulates those time stamps as a single stamp in the time stamp buffer 55. Since these time stamps do not pass any intermediate buffer, they are accumulated in the time stamp buffer 55 while maintaining the order of input.

The packets transferred from the packet buffers $64_1-64_8$ of the second stage switches $2_1-2_8$ are accumulated in the packet sorting buffers $52_1-52_8$ in the third stage switch $3_1$. The packets accumulated in the packet sorting buffers $52_1-52_8$ are output to a multiplexing circuit 58 without destructing the order under the control of an empty packet detecting portions $50_1-50_8$, a buffer condition monitoring portion 54 and a time stamp comparing portion 56.

The empty packet detection portions $50_1-50_8$ are provided corresponding to respective inputs of the packet sorting buffers $52_1-52_8$ for detecting that the packets input from the second stage switches $2_1-2_8$ are empty packet to report to the buffer condition monitoring portion 54. Namely, each of the empty packet detecting portions $50_1$ to $50_8$ detects the fact that no packet transferred from the packet buffers $64_1-64_8$ of the second stage switch is present.

The packet condition monitoring portion 54 monitors the packet accumulating condition of respective buffers $52_1-52_8$ to output a comparison enabling signal to a time stamp comparing portion 56 according to the packet accumulating condition and the result of detection by the empty packet detecting portions $50_1-50_8$.

In practice, the buffer condition monitoring portion 54 outputs the comparison enabling signal to the comparing portion 56 when the fact that no packet is present in the second stage switch corresponding to the empty packet sorting buffer is detected by the empty packet detecting portions $50_1-50_8$. Also, when packets are full in all packet sorting buffers $52_1-52_8$, the buffer condition monitoring portion 54 outputs the comparison enabling signal to the time stamp comparing portion 56.

In response to the comparison enabling signal, the time stamp comparing portion 56 compares the time of the leading time stamp among those accumulated in the time stamp buffer 55 and the time of the time stamp given for the leading packet of the packet sorting buffers $52_1-52_8$ to perform control for feeding the packet, time stamp of which matches with that of the leading time stamp in the time stamp buffer 55, to the multiplexing circuit 58.

With the control set forth above, it becomes possible to avoid a packet, which has not arrived yet to the 3rd stage switch, for any reason, and this packet is not joined in the packet sorting procedure.

When all packets provided with the time stamps consistent with the time of the leading time stamp of the time stamp buffer 55 are fed out from the packet sorting buffer, the leading time stamp of the time stamp buffer 55 is disposed and the next time stamp is shifted up to be the leading time stamp. With the similar procedure for the shifted new leading time stamp, the packets are transferred to the multiplexing circuit 58. The output of the multiplexing circuit 58 is input to the packet switching portion $63_1$.

In the packet switching portion $63_1$, the packets are distributed depending on destinations by the address filters $62_1-62_8$ and then accumulated in the packet buffers $64_1-64_8$. The packets accumulated in the packet buffers $64_1-64_8$ are fed out to the outgoing channels $9_{11}-9_{18}$.

The operation of the third stage switch $3_1$ is illustrated for better understanding in FIGS. 4 and 5. As shown in FIG. 4, the time of the leading time stamp of the time stamp buffer 55 is ④, and the time stamp provided for the leading packet of the packet sorting buffer $52_1$ is also ④. Accordingly, the packet provided the time stamp ④ is output to the multiplexing circuit 58.

As shown in FIG. 5, the packet having the time stamp consistent with the time ④ of the time stamp of the leading time stamp in the time stamp buffer 55, is not present any more in the packet sorting buffer $52_1-52_8$. Therefore, the time stamp having the time ④ is disposed.

Figure 6:
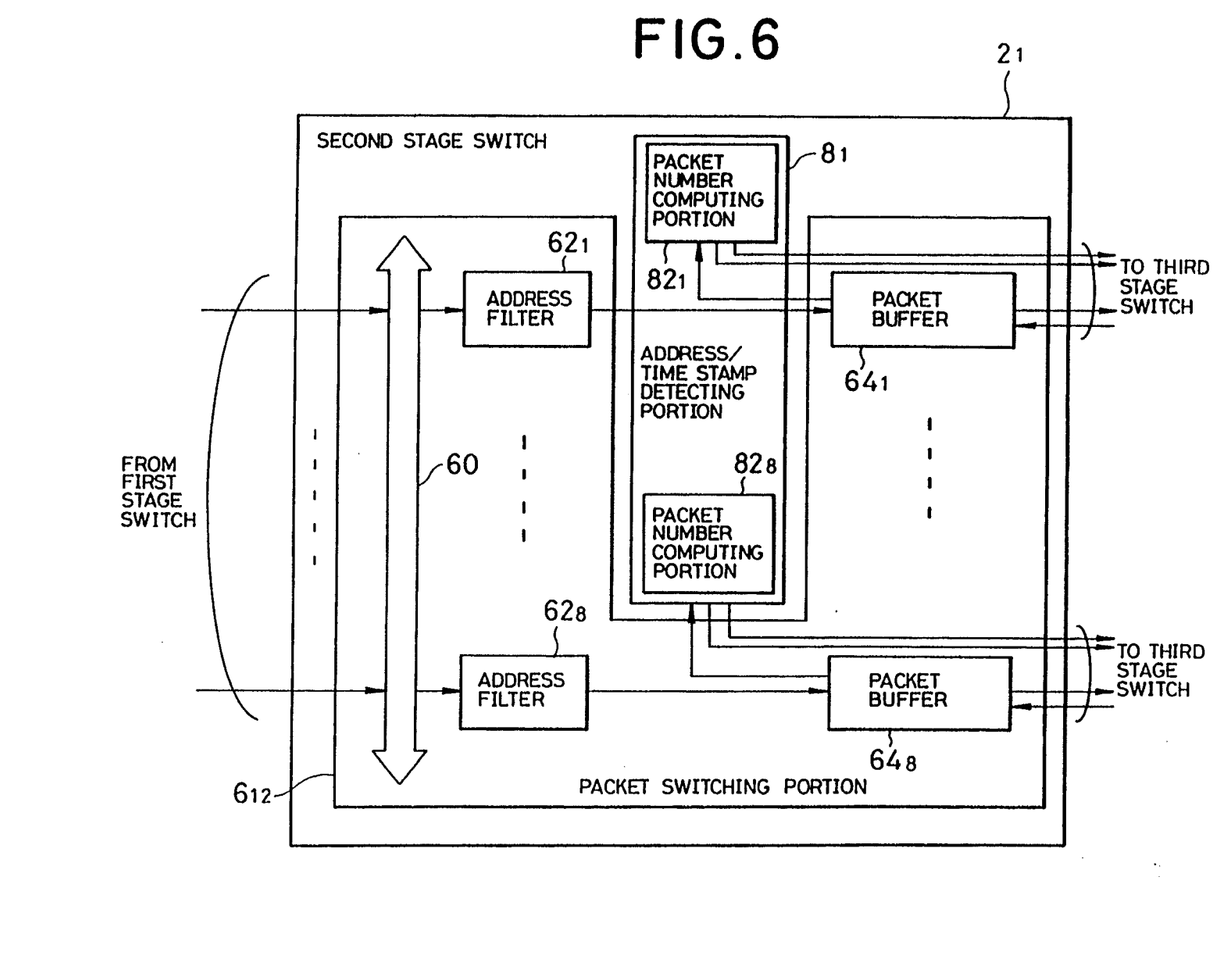
FIG. 6 is a block diagram of a second stage switch in another embodiment of the packet switching system according to the present invention.
Figure 7:
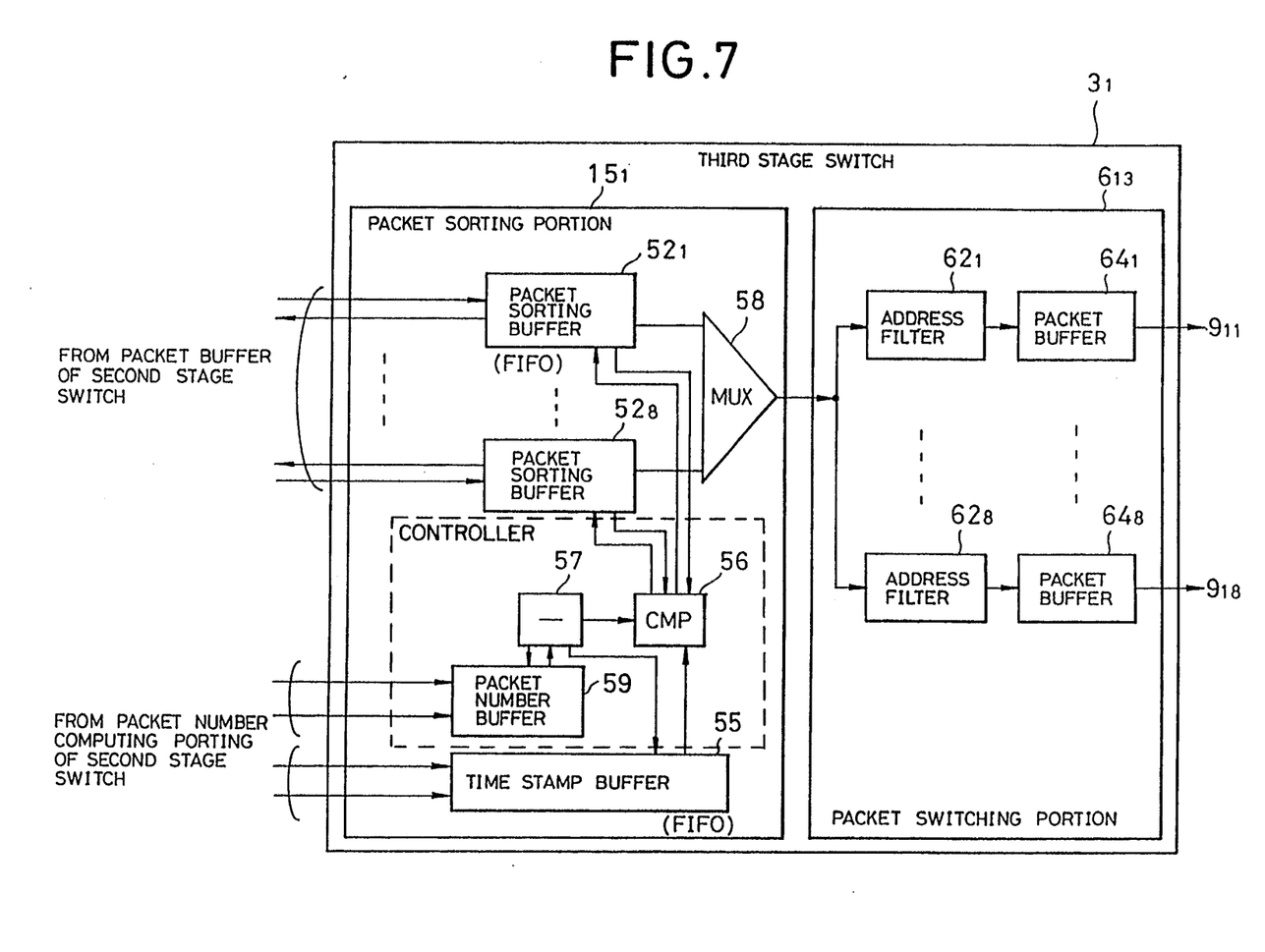
FIG. 7 is a block diagram of a third stage switch in another embodiment of the packet switching system according to the present invention.
Figure 8:
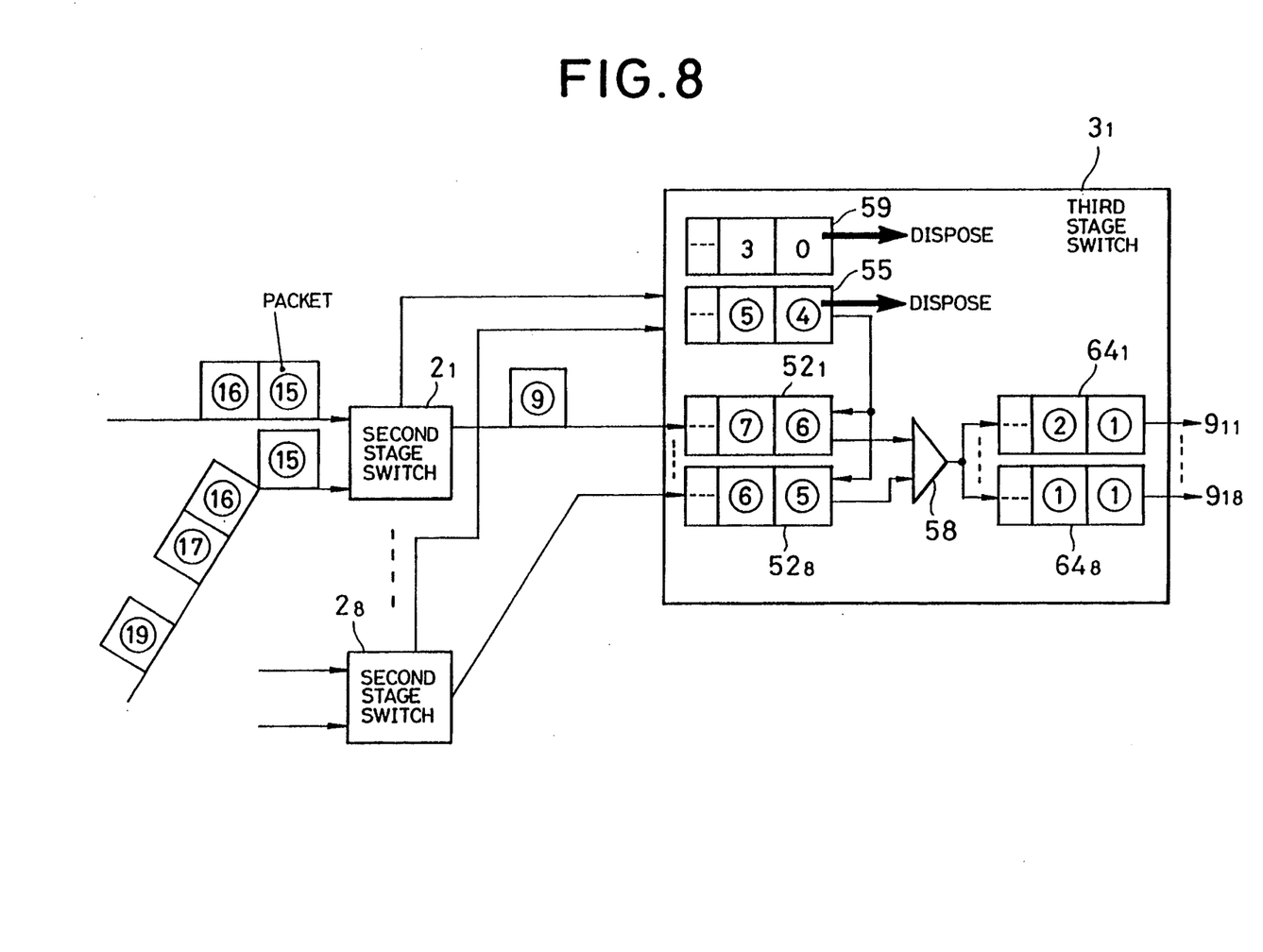
FIG. 8 is an illustration showing the operation of another embodiment of the packet switching system according to the invention.

Next, the second embodiment of the packet switching system according to the present invention will be discussed with reference to FIGS. 6–8. FIG. 6 is a block diagram of the second stage switch $2_1$ in the second embodiment of the invention. FIG. 7 is a block diagram of the third stage switch $3_1$ in the second embodiment of the invention. FIG. 8 is an illustration showing the operation of the second embodiment of the packet switching system according to the invention.

As shown in FIG. 6, in the second stage switch $2_1$, the packets transferred from the first stage switches $1_1-1_8$ are accumulated in the packet buffers $64_1-64_8$ with distribution by the address filters $62_1-62_8$ via the time division multiplexing bus 60. At this time, the time stamps provided in the header information of the packets are copied by the address and time stamp detecting portion $8_1$. By packet number computing circuits $82_1-82_8$ provided in the address and time stamp detecting portion $8_1$ corresponding to the packet buffers $64_1-64_8$, the time stamps are copied from the header information of the packets. At this time, the packet number computing circuits $82_1-82_8$ counts the number of time stamps of the same time. The time information of the time stamps and the number information of the time stamps having the same time are transferred to the third stage switches $3_1-3_8$.

As shown in FIG. 7, in the third stage switch $3_1$, the time stamp comparing circuit 56 compares the time of the time stamps of the leading packets in the packets accumulated in the packet sorting buffer $52_1-52_8$ and the time of the time stamp accumulated in the time stamp buffer 55. Number of the leading time stamp of the time stamps of the time stamp buffer 55 is accumulated in the packet number buffer 59 corresponding to the leading time stamp.

When the consistent time stamp is present, such packets are fed out from the packet sorting buffer $52_1$–$52_8$. Then, the number of the fed out packets is decremented from the value in the packet number buffer 59 by a packet decrementing circuit 57. When the number of the leading time stamps accumulated at the leading portions becomes "0", the leading time stamp of the time stamp buffer 55 is disposed. Then, the next time stamp is shifted to be the leading time stamp for repeating the operation set forth above.

On the other hand, the packet sorting buffers $52_1$–$52_8$ send a notice to the second stage switch $2_1$ to stop outputting the packet when the packet sorting buffers $52_1$–$52_8$ have no vacancy.

As shown in FIG. 8, when the number of time stamps accumulated at the leading portion of the packet number buffer 59 becomes "0", the leading time stamp of the time stamp buffer 55 is disposed. Simultaneously, the leading data of the packet number buffer 59 is also disposed.

In the above-mentioned second embodiment, by providing the packet number buffer 59, the packet sorting portion $15_1$ can detect the number of packets having the time stamps of the same arrival time. By this, it becomes possible to avoid the exclusion a packet, which has the not yet arrived from packet sorting procedure even when packet sorting procedure is initiated before all packets arrive. Therefore, further higher speed packet switching system than the former, first embodiment can be realized.

It should be noted that as the packet buffers $64_1$–$64_8$, the packet sorting buffers $52_1$–$52_8$ and the time stamp buffer 55, FIFO (First in First out memory) is preferably employed so that read control can be simplified.

As set forth above, according to the present invention, the internal blocking can be avoided by eliminating necessity of preliminary routing and a period required for sorting the packet can be shortened. In addition, the control necessary for sorting the packet can be simplified.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A packet switching system, comprising:
a plurality of incoming channels, through which packets arrive;
time information providing means for providing arrival time information in header information of respective packets;
time information detecting means for detecting said arrival time information provided in the header information of respective packets;
time information buffer means for accumulating the detected arrival time information in the order of the arrival time;
packet sorting buffer means for accumulating said packets provided with the arrival time information in the header information in the order of arrival thereto;
control means for outputting the packets accumulated in said packet sorting buffer means and having the arrival time information consistent with the arrival time information accumulated at a leading end of said time information buffer means;
first switching means for routing the packets output from said packet sorting buffer means according to a destination contained in the header information thereof; and
a plurality of outgoing channels for feeding out the routed packets.

2. A packet switching system as set forth in claim 1, which further comprises second switching means for routing the respective packets provided with the arrival time information by said time information providing means depending upon the destinations contained in the header information thereof, and
each of said packets routed by said second switching means being supplied to said packet sorting buffer means corresponding to the routes of said outgoing channels.

3. A packet switching system as set forth in claim 2, wherein each of said first and second switching means includes address filters, supplied with the packets output from said packet sorting buffer means, for distributing the routes depending upon the destination and packet buffer means for accumulating the packets per each output of the address filters in order.

4. A packet switching system as set forth in claim 3, which further comprises multiplexing means for multiplexing each output of said packet sorting buffer means corresponding to said routes, the multiplexed output of said multiplexing means being supplied to said first switching means for distribution of the routes.

5. A packet switching system as set forth in claim 4, wherein said packet sorting buffer means comprises a First In First Out memory.

6. A packet switching system as set forth in claim 1, wherein said time information detecting means includes counting means for counting a number of packets having the same arrival time information, and
said control means includes storage means for storing the counted value of said counting means corresponding to said arrival time information and means for subtracting said counted value of said counting means by one every time one of said packets having the header information containing said same arrival time information is output.

7. A packet switching system as set forth in claim 6, wherein said control means disposes the arrival time information accumulated at a leading end of said time information buffer means when the counted value of said storage means becomes equal to 0 and shifts the next information to the leading end.

* * * * *